United States Patent [19]

Sciaky

[11] 4,024,370
[45] May 17, 1977

[54] TOROIDAL RESISTANCE WELDING TRANSFORMER

[75] Inventor: David Sciaky, Chicago, Ill.

[73] Assignee: Sciaky Bros., Inc., Chicago, Ill.

[22] Filed: Sept. 8, 1975

[21] Appl. No.: 611,437

[52] U.S. Cl. .................................. 219/90; 336/229
[51] Int. Cl.² .................. B23K 11/10; H01F 27/28
[58] Field of Search ............... 219/90, 116; 336/60, 336/62, 82, 229

[56] References Cited

UNITED STATES PATENTS

| | | | |
|---|---|---|---|
| 2,269,726 | 1/1942 | Martin | 336/82 X |
| 2,644,067 | 6/1953 | Watson | 336/82 X |
| 3,040,162 | 6/1962 | Hunter | 336/62 X |
| 3,201,728 | 8/1965 | McWhirter | 336/60 |
| 3,564,708 | 2/1971 | Harris | 336/229 X |
| 3,629,759 | 12/1971 | Douglas et al. | 336/82 |
| 3,697,914 | 10/1972 | Khrenov et al. | 336/62 |

Primary Examiner—J. V. Truhe
Assistant Examiner—N. D. Herkamp
Attorney, Agent, or Firm—Julius L. Solomon

[57] ABSTRACT

A transformer for application in portable resistance welding machines assembled from toroidal sections of iron core, primary and secondary windings arranged concentrically one with another. The primary is constructed from copper plate modules so as to form a continuous single layer winding of toroidal form in which the separate modules are electron-beam welded one to another in order to form the continuous primary winding. A single turn secondary completely encloses the primary winding and iron core so as to form a compact cylindrical electrical transformer structure. A liquid electrical insulating material is sealed within narrow gaps between iron core, primary winding and secondary winding to allow good thermal transfer from these elements to a cooling medium and at the same time stabilize the relative position of these elements against the dynamic forces developed by the high currents passing through the secondary.

10 Claims, 5 Drawing Figures

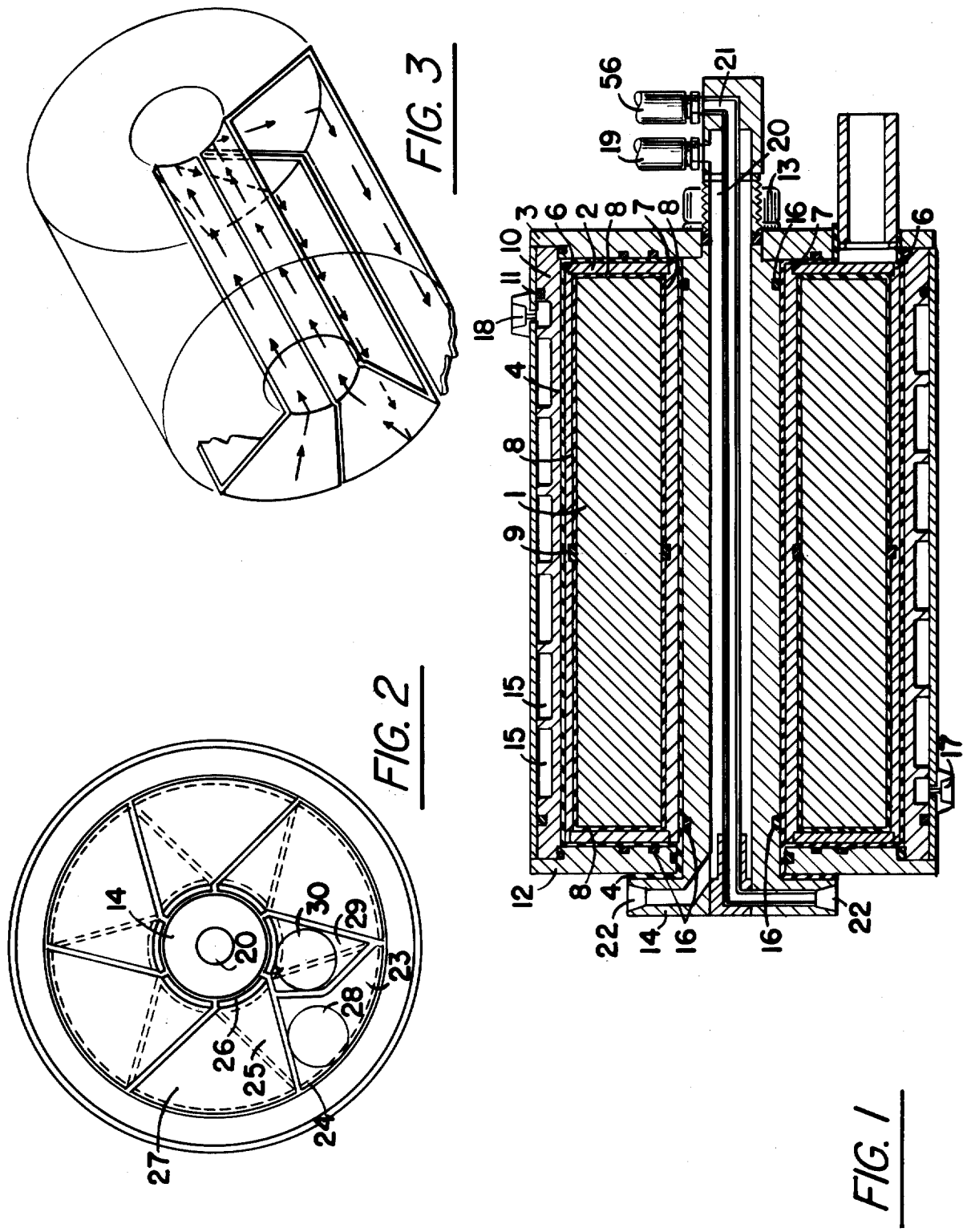

TOROIDAL RESISTANCE WELDING TRANSFORMER

This invention relates to resistance welding apparatus and, more specifically, to resistance welding apparatus of the portable type. Resistance welding is a process whereby metal articles are fastened to one another by applying a force between the two sheets to be welded at the desired fastening point by means of a mechanical press carrying electrodes which are applied across the overlapped metal sheets at the desired welding point. Current from the low voltage secondary of an electrical transformer whose secondary terminals are connected to the electrodes passes through the electrodes and through the thickness of the overlapped sheets. The localized area at which the two sheets are in contact represents an area of maximum resistance in the secondary circuit and the heat developed by the current from one sheet to the next raises the temperature of the metal locally until it becomes plastic so that the two sheets merge at this local spot one into the other under the pressure of the electrodes to form what is commonly called a "spot weld". Usually the spot welder containing the electrical transformer, the press, and the electrodes, is a stationary device and parts which may be handled manually or by a conveyor system are brought to the welder. There are applications, however, where welding is required on large structures which cannot readily be carried to and welded in a stationary resistance welding machine. For this type of application portable resistance welding machines have been devised which consist of a relatively small pneumatic press which carries the electrodes and a flexible cable for carrying current from the low voltage secondary of a transformer which is usually mounted at a distance of eight or more feet from the welding gun on a fixed structure or a crane. Welders of this type are relatively inefficient in operation inasmuch as the secondary circuit which includes the secondary electrode structure and the cable to the transformer, represents a high secondary impedance. The greater the secondary impedance the greater will be the KVA demand in the secondary circuit inasmuch as the KVA damand equals $I^2Z$, the secondary current squared times the secondary impedance. The present invention utilizes a novel design of welding transformer and electrode carrying gun arrangement by which the secondary circuit impedance is reduced to the very minimum so that high secondary currents may be developed in the secondary circuit with the minimum of KVA demand from the power supply.

The object of the invention is to obtain a welding transformer which is compact, efficient and light in weight.

Another object of the invention is to obtain a welding transformer to which a welding gun may be directly and readily attached.

Another object is to obtain a welding transformer in which the primary and secondary may be produced by machining and electron beam welding operations.

Portable resistance welding machines are used extensively in the automotive industry for the welding of automobile and truck bodies. Because of the large size of these structures and their shape it is difficult, inconvenient and sometimes impossible to utilize stationary welding equipment for the fastening of the various parts of these bodies which are fabricated from sheet steel having a thickness of approximately 0.040 inches.

Recently in an effort to reduce the weight of the automobile, so as to reduce the energy requirements for propelling vehicles, automobile and truck bodies have been constructed of aluminum rather than steel. However, for the same material thickness, aluminum because of its much lower resistivity requires approximately three times as much current or nine times as much power demand as is required for the spot welding of steel. The toroidal type welding transformer and gun assembly which is the object of this invention was developed in order to make possible the welding of aluminum at a reduced KVA demand from that which is required with the conventional portable welding equipment heretofore available. As stated above, the conventional portable welding system consists of an overhead suspended welding transformer, a welding gun consisting of the welding electrodes, their support and the means for applying force between the sheets to be welded, a flexible cable which connects the welding transformer to the gun, a pressure system and a control to effect a desired program of welding current, time and electrode force. The cable connecting a low voltage secondaries of the welding transformer to the welding gun is typically eight feet in length and has a cross-sectional area of 500,000 circular mils. The toroidal transformer system in accordance with this invention, consists of an overhead isolation transformer which reduces the line voltage to a lower voltage, typically 44 volts under an open secondary circuit condition, the toroidal transformer and gun combination, a flexible cable which connects the secondary of the isolation transformer to the primary of the toroidal welding transformer gun combination, a pressure system, and a control. A typical cable would be eight feet in length having a 257,000 circular mil copper section. Inasmuch as the toroidal welding transformer and gun are integrated into one unit, the KVA demand from the power supply is reduced approximately 75% from that required by the conventional portable welding system because the current demanded by the toroidal transformer primary is much less than the current required in the cables of the conventional portable welder. In the conventional system the cable current is the welding current. In order to deliver 50,000 amperes welding current to the secondary circuit the cable current for the conventional system would be 50,000 amperes whereas the cable utilizing the toroidal transformer would be a mere 833 amperes.

It has been found that the effort required by the welding machine operator to handle the toroidal transformer and gun assembly is much less than that required to handle the standard portable gun. This is due to the fact that the 257,000 circular mil cable is much more flexible than the 500,000 circular mil cable required in a conventional portable machine. The overall result then is a higher production rate with less effort on the part of the machine operator.

Tests conducted to compare the toroidal transformer portable welder to a direct current portable welder showed that the toroidal arrangement resulted in a KVA demand from the line which was 75% less than for the direct current welder, the kilowatt consumption per weld was 83% less and the water consumption 61% less then both units were delivering a secondary welding current of 50,000 amperes at the same duty cycle.

The above and other related objects and features of the present invention will be apparent from a reading of the description of the disclosure shown in the accompanying drawings and the novelty thereof pointed out in the appended claims. In the drawings;

FIG. 1 is a cross-sectional view along a diametrical plane of the toroidal transformer.

FIG. 2 is an end view of the transformer, with the end covering removed, which shows the configuration of a portion of the primary windings.

FIG. 3 is a schematic illustration of the primary winding arrangement.

Figure 4:
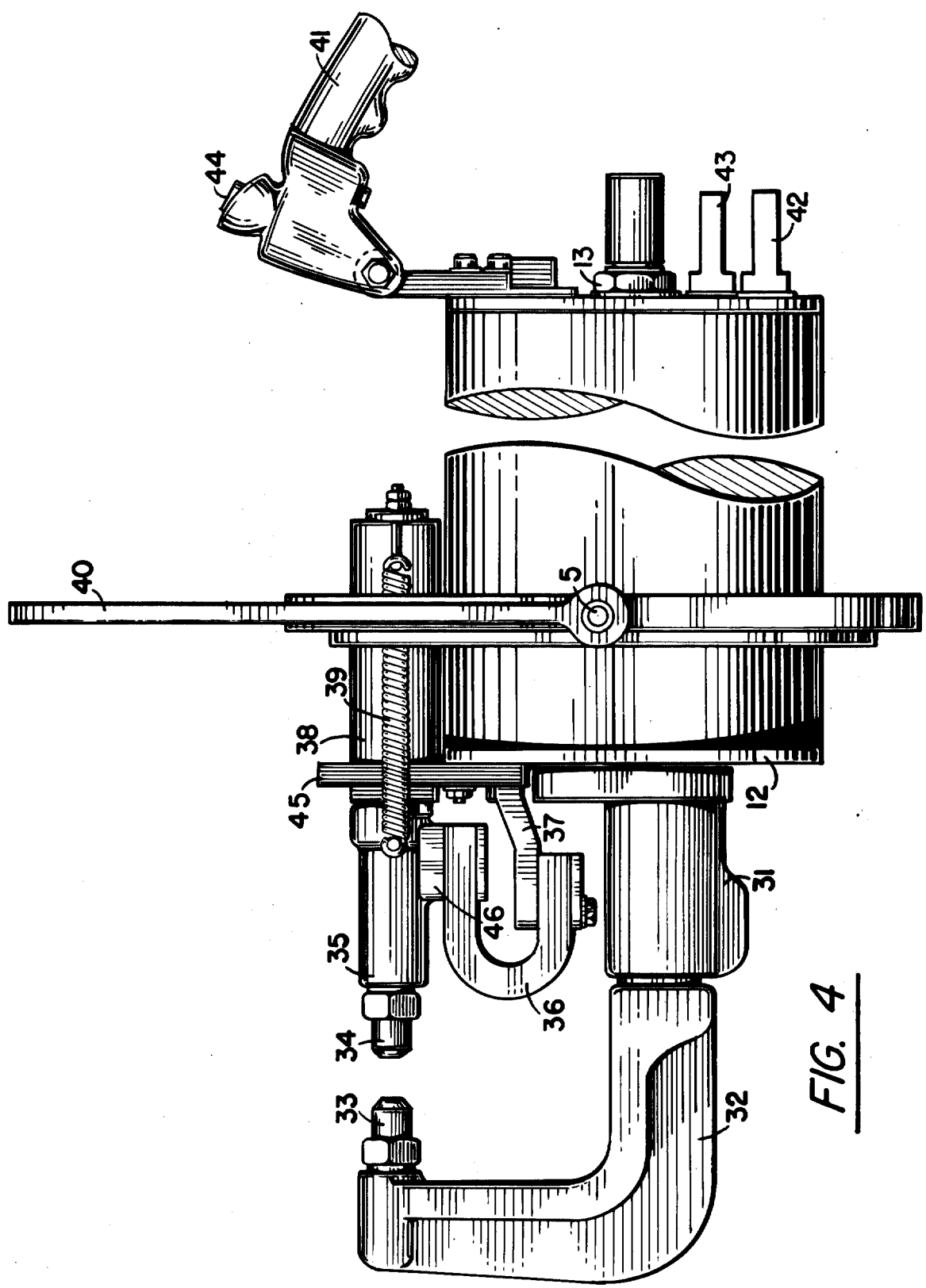
FIG. 4 is a drawing of the transformer of the present invention fitted with welding electrodes and a fluid operator.

FIG. 1 is a cross-sectional view of the toroidal transformer. The toroidal iron core magnetic circuit 1 is manufactured by winding a strip of a suitable magnetically oriented iron core material around a cylindrical mandrel and fastening the inside and outside turn by means of a few spot welds. The primary winding 2 is fabricated of copper plates which are so shaped that when assembled in a suitable fixture the several sections may be welded together so as to form, as in the example shown in the figures, a six turn primary winding of toroidal shape with the winding arranged in a single layer. In order to fabricate the primary winding the parts are assembled in a suitable jig. The parts for the primary include internal longitudinal members and external longitudinal members which will lie essentially parallel to the axis of the completed transformers, and end members, left and right, which connect successively an inner longitudinal member to the outer longitudinal member of the adjacent turn. After placement in the fixture, the end members are electron beam welded to the longitudinal members to form a joint along the seams 6 and 7.

Welding the segments by means of the electron beam welding process results in a structure in which a minimum of space is needed between the primary and adjacent parts of the transformer; namely the iron core and the secondary structure. This is due to the fact that the electron beam process makes possible the welding of structures with a minimum of distortion and change in part dimension after welding because the heat input into the work is a minimum as compared to other methods of welding or brazing. Moreover, the electrical resistance of the joint is also at a minimum. When the six inner and six outer weld seams are completed the structure will consist of the iron core 1 which has been previously mounted in the fixture along with spacers 9 which serve to insulate and to separate the iron core from the primary winding, surrounded by the primary winding open at one end inasmuch as the segments at the left-hand side are not yet in position. These segments are then placed in position and electron beam welded after which the primary winding is complete and the iron core 1 which is insulated and positioned with respect to the primary encloses the separators 9 and insulating material 8 which surrounds the iron core. The secondary single turn winding consists of the hollow cylinder 10, left-hand end-plate 12, right-hand end-plate 3 and center conducting member 14. Left-hand end-plate 12 is placed in position over the secondary center member 14 with suitable insulation 4 and snubbers 16 separating the two members. The primary winding and iron core assembly is then slid over the center secondary conductor 14 after the snubber separators 16 have been installed. The outer secondary conducting member 10 is installed over the insulation 4 which has been put in place over the primary windings, the outer closure cylinder 11 is slid over the assembly, end-plate 3 is put into place and both end plates are fastened to the outer secondary member 10 by suitable bolts arranged circumferentially close to the outer edge of the two end plates. The lock nut 13 bearing on end-plate 3 through a washer is fastened in place so that the center member 14 makes good electrical contact with a portion of the surface of end-plate 3. Water cooling passages are provided in the outer secondary cylinder 10 by means of helical channel 15 which is machined along the outer surface of this member. Cooling water may be circulated through the helical channel from the entrance water fitting 17 through spiral groove 15 and out through fitting 18. A passage 20 for water is provided in the center secondary member 14 so that water may circulate from the inlet 19 through the passage 20 and return through the passageway 21 after having cooled gun members which may have connection with the ports 22.

FIG. 2 is a drawing which illustrates the primary coil segments at the right-hand end of the transformer. Segment 23 shown in solid lines is one end of the primary winding and is fitted with a terminal pad 28. The outer edge of segment 23 is electron beam welded to longitudinal segment 24. At its opposite end the longitudinal member 24 is welded to the outer edge of the end element 25, shown outlined by the dotted lines. The inner edge of left-hand end element 25 is welded to the end of longitudinal member 26 and the opposite end of the longitudinal member 26 is welded to the inner edge of segment 27 which is shown outlined in solid lines. The welds connect successive elements in turn with element 29 making the end of the winding to which is attached the pad 30 to which the terminal may be attached for connection to the source of supply for the toroidal transformer. The primary winding is thus assembled from three basic modules, an outer longitudinal module, an inner longitudinal module, and the end module. One of the end module segments is split to form the winding ends 23 and 29.

FIG. 3 illustrates in schematic form the construction of the primary winding, the arrows showing the connection between one element and the next and indicating also the path the current would take through the primary winding.

FIG. 4 is a side view of the toroidal transformer and gun assembly. The gun yoke support 31 is shown in place over the end of center secondary element 14 which is hidden in this view. The yoke support 31 is securely fastened to the end of the secondary element in such a way that good electrical connection is provided between the surface of the center secondary element 14 and a mating surface provided on the yoke support 31. The yoke 32 is secured and may be adjusted within the bore provided in the yoke support 31. It carries the replaceable electrode tip 33 and is preferably provided with water cooling passages in order to provide water cooling for the electrode tip 33. The water cooling passages make connection with the ports 22 so that water may be circulated from the inlet port 19 through the center member of the secondary of the transformer 14 through the gun yoke and return through exit port 56. End member 12 of the toroidal transformer provides the second terminal for the secondary of the transformer. Conducting member 37 is secured to end member 12 and flexible conductor 36, which is constructed of a multiplicity of thin copper laminations, connects member 37 to the connection pad 46 on electrode support 35 which carries the second replaceable electrode tip 34. The pneumatic or hydraulic operator 38 carries the electrode holder 35 and when energized will cause the electrode holder 35 to move towards the left until electrode tip 34 meets stationary electrode tip 33 and a force is applied between the electrodes depending upon the pressure applied by the pneumatic or hydraulic operator 38.

The pneumatic or hydraulic operator 38 is securely mounted to the end-plate 12 of the toroidal transformer by means of mounting member 45. The pneumatic or hydraulic operator 38 consists of a cylinder and piston which is fastened by a well guided piston rod to the movable electrode holder 35. When fluid under high pressure is admitted to a space within the pneumatic or hydraulic operator between the piston head and the internal wall of the cylinder furthest away from the electrode the piston will move towards the left carrying with it the electrode 35 and the tips will engage any work placed between them with a force depending upon the pressure per square inch exerted by the fluid multiplied by the cross-sectional area inside the cylinder. When the fluid under high pressure is removed from the inside of the cylinder the spring 39 will pull the electrode holder to the right and return the electrode holder to its rest position.

Pistol grip 41 is fastened in a convenient position to the end-plate 3 at the right-hand rear end of the toroidal transformer. Push button 44 is provided on the pistol grip for initiating a weld program after the electrodes have been placed in the approximate position on the work where a spot weld is desired. The toroidal transformer primary terminals 42 and 43 which are connected internally to pads 28 and 30 which are fastened to the beginning and end of the primary winding are provided for connection to a conventional low reactance cable so that current may be fed from the power source to the toroidal welding transformer. A support ring 40 allows the transformer to be rotated over an appropriate angle about a line between two pivots 57 mounted at diametrically opposed points on the outer surface of the welding transformer.

Figure 5:
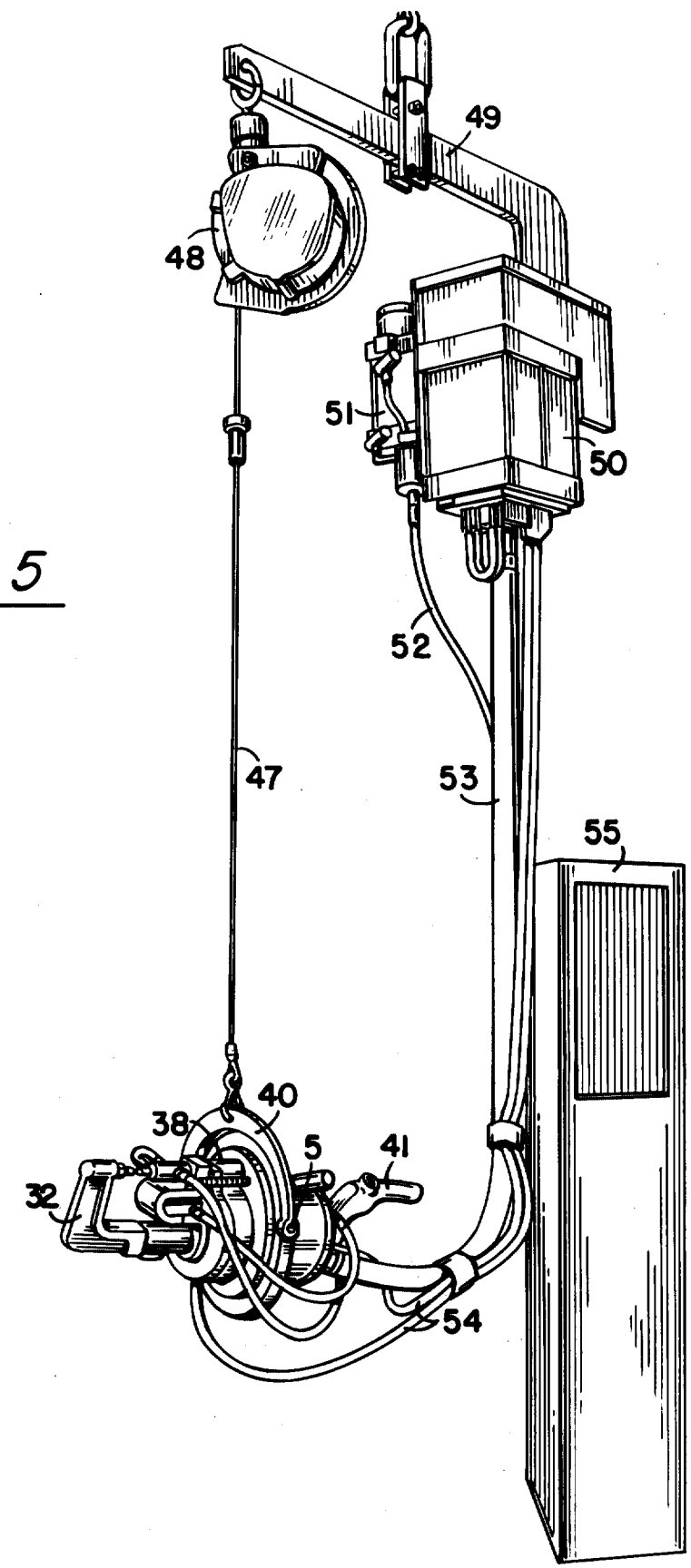
FIG. 5 illustrates a portable resistance welder machine installation which includes the transformer arrangement of this invention.

FIG. 5 illustrates a portable resistance welding machine installation utilizing the toroidal transformer and gun described herein. The welding transformer and gun assembly is supported through cable 47 and spring balancer 48 to the balancing supporting structure 49 to which is fixed isolating step down transformer 50 which reduces the 220 or 440 power supply line voltage to the voltage required at the input terminals of the toroidal welding transformer. A pressure booster 51 is mounted on one side of the step down transformer 50 and a high pressure hose 52 carries the fluid under high pressure to the pressure operator 38. Low reactance electrical cable incorporating stranded copper conductors of sufficient cross-sectional area is connected between the terminals of the step down transformer 50 and the toroidal welding transformer and control cabinet 55 is provided with the equipment to control the welding program which determines the pressure applied to the sheets being welded and the duration and intensity of the current which is passed through the sheets in order to develop the heat required for the particular welding operation.

The step down transformer 50 has the function of reducing the power supply line voltage which may be 220, 440, or 550 to a lower value which is relatively safe. In addition to this, the secondary of the step down transformer is provided with a center tap as is the primary of the toroidal welding transformer so as to further reduce the potential between the frame of the toroidal transformer, which is normally grounded, to either one of its primary terminals. This brings the voltage in the case previously cited between the piston grip 41 and the primary terminals of the toroidal transformer to the safe level of 22 volts.

Because of the unique construction of the toroidal transformer there exists a very narrow toroidal gap between the iron core and the primary windings, between the inner primary conductors and the central secondary conductor and between the outer primary conductors and the outer secondary cylinder. These gaps are filled with insulating material, preferably a silicone compound, to achieve effective cooling of the conductors, avoid over-heating and allow a very high current density through the conductors. This compound while serving as a very effective thermal conductor at the same time stabilizes the relative positions of iron core, primary winding, and secondary thus offering protection against the electrodynamic forces which tend to be extremely high because of the high currents passing through the conductors which are in close proximity to one another.

What I claim is:
1. A transformer adaptable for use in portable resistance welding machines comprising:
    a hollow regular cylindrical iron core wound from a continuous strip of magnetic iron core material; electrically insulating material surrounding the said iron core; a single layer primary winding fabricated from a multiplicity of electrically conductive segments so as to form a continuous single layer winding of toroidal form surrounding the said iron core and insulation; a single turn secondary in close proximity to, but insulated from, and enclosing completely the said primary winding and iron core so as to form a compact cylindrical electrial transformer structure having fixed secondary terminals at one end and primary terminals at the opposite end.

2. A transformer as described in claim 1 in which the said secondary comprises a central cylindrical electricity conducting member centered with longitudinal axes aligned within an outer hollow cylindrical electricity conducting member; a disk of electricity conducting material so arranged as to make connection between one end of the said central cylindrical conducting member and the adjacent end of the said outer cylindrical conducting member; a second conducting disk, for making connection to the opposite end of the said outer secondary cylindrical conducting member, having a hole at its center whose edge is in close proximity but not touching any portion of the said central cylindrical conducting member and insulating spacers and material confined between the inner surface of the said secondary structure and the aforementioned core and primary winding structure.

3. A transformer with a secondary structure as in claim 2 in which the said outer hollow cylindrical conducting member is formed with a helical channel about its outer surface; a second cylinder surrounding the said outer cylindrical conducting member; means for sealing the said second cylinder from the said cylindrical conducting member so that a cooling fluid may be circulated through said channel without leakage between the said cylindrical member and the said second cylinder.

4. A toroidal transformer as in claim 2 in which the primary winding is fabricated from a multiplicity of electrically conductive segments formed in three modular shapes.

5. A welding transformer as in claim 4 in which the said primary winding segments are fastened by the electron beam welding process.

6. A toroidal welding transformer as in claim 4 in which the center secondary member is formed with water cooling passages.

7. A welding transformer as in claim 6 including means for mounting a portable welding gun yoke support directly to the secondary center member.

8. A welding transformer and gun assembly as in claim 7 including means for water cooling the yoke and stationary electrode tip through internal passageways whose ports mate with ports on the said center member of the secondary of the toroidal transformer.

9. A welding transformer as in claim 7 including an insulating compound sealed within the space between the iron core and the primary, between the inner primary conductors and the central secondary conductor and between the outer primary conductor and the outer secondary cylinder.

10. A welding transformer as in claim 9 in which the said insulating material is a silicone compound.

* * * * *